F. P. MILLER.
COUPLING.
APPLICATION FILED MAR. 2, 1921.
1,431,830.
Patented Oct. 10, 1922.
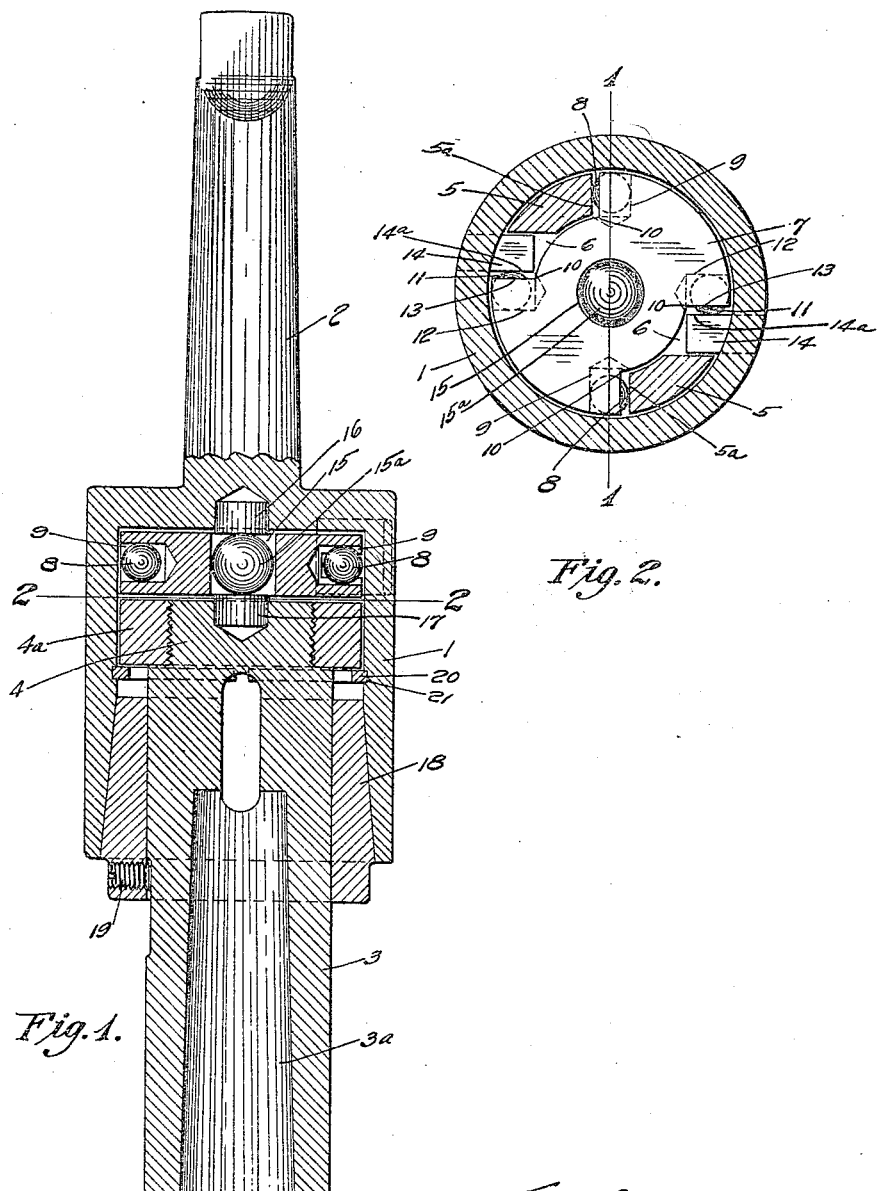

Patented Oct. 10, 1922.

1,431,830

UNITED STATES PATENT OFFICE.

FRANK P. MILLER, OF MEADVILLE, PENNSYLVANIA.

COUPLING.

Application filed March 2, 1921. Serial No. 449,100.

*To all whom it may concern:*

Be it known that I, FRANK P. MILLER, a citizen of the United States, residing at Meadville, in the county of Crawford and State of Pennsylvania, have invented new and useful Improvements in Couplings, of which the following is a specification.

This coupling is designed for driving members which are off-set, or out of aline-ment and in the embodiment specifically shown is applied to a tool-holding device for use with reamers. With such tools it is desirable that the reamer follow the original axis of the hole being reamed. If the reamer is not directly in line and the holder is rigid obviously there is an unequal cutting of the reamer and in consequence a certain amount of inaccuracy. Again if the axis of the hole is at a slight angle to the axis of the holder there is a resulting inaccuracy. With the present device the reamer is positively driven but is permitted to follow the axis of the hole either when the axis of the hole is slightly off-set from that of the holder, or when the axis of the hole is at a slight angle and this is accomplished without any side strain through the driving connection on the reamer.

The invention is illustrated in the accompanying drawings as follows:—

Fig. 1 shows a central section on the line 1—1 in Fig. 2.

Fig. 2 a section on the line 2—2 in Fig. 1.

1 marks the head, 2 the shank on which the head is mounted, 3 the tool holder, and $3^a$ a tapered opening in the tool-holder adapted to receive the shank of a reamer or similar tool.

The tool-holder has a reduced extension 4 which is screw-threaded and a driving head $4^a$ is screwed on to the extension 4. The head $4^a$ has the axial extensions 5 near its periphery which extend into peripheral slots 6 in the floating driving connection 7. Balls 8 are arranged in radial slots 9 (see dotted lines Fig. 2) in the connection 7 and project slightly from these radial sockets, the slots 6 being extended at 10 sufficiently to expose the balls. These balls engage the surfaces $5^a$ on the projections 5, the surfaces $5^a$ being opposingly placed and parallel. Similar balls 11 are placed in radial sockets 12 in the connection 7 and the peripheral slots 6 are cut away at 13 so as to expose the balls 11 and these balls engage driving projections 14 having surfaces $14^a$ opposingly placed and parallel, the projections being seated and secured in the head 1.

It will readily be seen that with the off-set movement of the holder in the direction of the surface $5^a$, the balls 8 will roll on these surfaces permitting this movement and eliminating friction in its accomplishment. On the other hand, if there is an off-set movement in the direction of the surfaces $14^a$ the balls 11 will roll on these surfaces, thus permitting this movement without friction and it will be noted that a combination of the two movements permits of the off-setting of the axis of the holder relatively to the head with a perfect driving connection throughout the cycle of rotation and the variations in position being accomplished with a roller bearing.

The floating driving connection 7 has a central opening 15 in which is arranged a thrust ball $15^a$. This ball operates on the ends of hardened pins 16 and 17 mounted in the head 1 and holder 3 respectively. It will readily be seen that this ball receives the thrust of the reamer and if there is an axial off-set that the ball readily accommodates this movement without friction. If there is a slight angular variation the ball operates as a pivot on which this can take place without friction.

It is sometimes desirable to limit the relative movement between the head and holder and also provide means by which this may be varied. I accomplish this by means of a tapered sleeve 18 which is slidingly mounted on the holder and may be locked in any position by a set screw 19. The socket in the head is tapered to correspond to the taper of the sleeve 18. It will readily be seen that as the sleeve is moved in or out, the permissible relative movement may be increased or decreased, or if it is desired to have the holder rigid with the head, the sleeve may be moved into engagement with the head and so prevent any relative movement.

In order to retain the holder in the head I provide the split ring 20 which is snapped into the annular groove 21 in the head and engages the driving head $4^a$ on the holder and thus retains the holder in the head.

While I have described my invention as applied to a reamer holder it will be understood that in its broader phases it is applicable to any coupling in which the driving and driven members are off-set or out of alinement.

What I claim as new is:—

1. A coupling comprising a driving member, a driven member, an intermediate independent floating connection, and a spherical thrust member reaching through the floating connection to receive the axial thrust of the driven member and permit radial and pivotal movement of said driven member, relatively to said driving member.

2. A coupling comprising a driving member, a driven member, an intermediate independent floating connection, and a spherical thrust member engaged by plane surfaces, reaching through the floating connection to receive the axial thrust of the driven member and permit radial movement in a transverse plane and pivotal movement of said driven member relatively to said driving member.

In testimony whereof I have hereunto set my hand

FRANK P. MILLER.